United States Patent [19]
Yagi et al.

[11] Patent Number: 5,948,519
[45] Date of Patent: Sep. 7, 1999

[54] POROUS BIAXIALLY-ORIENTED FILM COMPRISING HIGH MOLECULAR ETHYLENE/α-OLEFIN COPOLYMER AND ITS USE

[75] Inventors: Kazuo Yagi; Akinao Hashimoto; Hitoshi Mantoku, all of Yamaguchi-ken, Japan

[73] Assignee: Mitsui Chemicals, Inc., Tokyo, Japan

[21] Appl. No.: 08/740,365

[22] Filed: Oct. 28, 1996

Related U.S. Application Data

[63] Continuation of application No. 08/442,563, May 16, 1995, abandoned.

[30] Foreign Application Priority Data

May 16, 1994 [JP] Japan ..................................... 6-125824

[51] Int. Cl.⁶ ....................................................... B32B 3/26
[52] U.S. Cl. ..................................... 428/304.4; 428/308.4; 428/315.7; 428/316.6; 428/318.4; 428/319.9
[58] Field of Search ............................. 428/316.6, 319.9, 428/318.4, 308.4, 315.7, 304.4

[56] References Cited

U.S. PATENT DOCUMENTS 5,385,777   1/1995   Higuchi et al. ...................... 428/316.6

FOREIGN PATENT DOCUMENTS 2-094356   4/1990   Japan .
3-105851   5/1991   Japan .
5-025305   2/1993   Japan .

OTHER PUBLICATIONS

Saunders, "Organic Polymer Chemistry" pp. 48–62 2nd Edition, Chapman–Hall, 1988.
Whelan, "Polymer Technology Dictionary", (1994) pp. 224–225 [Defines LLDPE].

*Primary Examiner*—Cecilia J. Tsang
*Assistant Examiner*—Patrick R. Delaney
*Attorney, Agent, or Firm*—Birch, Stewart, Kolasch & Birch, LLP

[57] ABSTRACT

A porous biaxially oriented film comprising a copolymer of an ethylene having an intrinsic viscosity [η] of from 3.5 to 10.0 dl/g and an α-olefin having 4 to 8 carbon atoms, the content of the α-olefin being in a number of from 1.0 to 7.5 per 1000 carbon atoms and the film retaining the structure which is based upon the microfibrils when it is heat-treated at 160° C. under a constrained state and is then observed at room temperature, and a separator made of this film for batteries. The porous biaxially oriented film exhibits excellent gas permeating property over a practicable temperature range, exhibits excellent mechanical strength and, particularly, tensile strength, and loses gas permeating property when a maximum practicable temperature is exceeded. The film can be favorably used as a separator for batteries.

19 Claims, 4 Drawing Sheets

(MAGNIFICATION; 10,000)
(BEFORE HEAT-TREATMENT; EXAMPLE 3)

(MAGNIFICATION: 10,000)
(AFTER HEAT-TREATED AT 160°C; EXAMPLE 3)

(MAGNIFICATION: 10,000)
(BEFORE HEAT-TREATMENT; COMPARATIVE EXAMPLE 9)

(MAGNIFICATION: 10,000)
(AFTER HEAT-TREATED AT 160°C; COMPARATIVE EXAMPLE 9)

POROUS BIAXIALLY-ORIENTED FILM COMPRISING HIGH MOLECULAR ETHYLENE/α-OLEFIN COPOLYMER AND ITS USE

This application is a continuation, of application Ser. No. 08/442,563 filed on May 16,1995, now abandoned.

BACKGROUND OF THE INVENTION

1. Field of the Invention

The present invention relates to a porous biaxially-oriented film comprising a high molecular ethylene/α-olefin copolymer. More specifically, the invention relates to a porous biaxially-oriented film having excellent tensile strength and to a separator for batteries for which the porous biaxially-oriented film is preferably used.

2. Description of the Related Art

It has heretofore been known to use a fine porous film of a polypropylene as a separator for batteries since before the filing of the present application as disclosed in, for example, Japanese Patent Publication No. 40119/1971. The film has a fine penetrated porous structure in addition to a rigid nature possessed by the polypropylene, and features rigidity (excellent stiffness), exhibits excellent resistance against mechanical stress at the time of assembling the batteries, is adapted for use as a separator, is easy to use, and permits a lower percent of defects to occur during the production. It has been known that the fine porous film of polypropylene exhibits good electric conductivity near ordinary temperature in a state where an electrolytic solution and an electrolyte are contained in the fine pores but exhibits increased electric resistance in a high temperature region.

In case an abnormal current flows from the battery due to a short-circuit or the like, it can be expected that the separator having such a property works to prevent the flow of an excess current since the temperature rises in the battery due to the thermal resistance and the internal resistance increases. In the case of the polypropylene, however, such a function is not exhibited when the temperature is not higher than 180° C.; i.e., this function cannot be expected at a temperature which is not higher than 150° C.

In recent years, large amounts of energy have been packaged in a small volume owing to the progress in the performance of batteries, and it is quite natural from the standpoint of safety to provide a separator which exhibits a current blocking function when an abnormal current flows even in a relatively low temperature range.

In order to realize such a function (current cut-off function in case of short-circuiting), to reinforce the function and to obtain the function at low temperatures, there has been proposed a separator film for batteries comprising a porous film of a mixture of a polyethylene having a viscosity-average molecular weight of not larger than 300,000 and a polyethylene having a viscosity-average molecular weight of not smaller than 1,000,000 (Japanese Laid-Open Patent Publication No. 21559/1990).

As a related technology, furthermore, Japanese Laid-open Patent Publication No. 105851/1991 discloses a separator for lithium batteries comprising a polyethylene composition which contains an ultra-high molecular polyethylene having a weight-average molecular weight of not smaller than 70,000 in an amount of not smaller than 1% by weight, and has a weight-average molecular weight (Mw)/number-average molecular weight (Mn) ratio of from 10 to 300.

Furthermore, Japanese Laid-Open Patent Publication No. 25305/1993 discloses technology for producing a fine porous polyethylene film used as a separator for batteries, the fine porous polyethylene film being obtained by biaxially orienting a composition comprising 1 to 69% by weight of an ultrahigh molecular polyethylene having a weight-average molecular weight of not smaller than 700,000, 98 to 1% by weight of a high-density polyethylene and 1 to 30% by weight of a low-density polyethylene, and having a weight-average molecular weight/number-average molecular weight ratio of from 10 to 300, or by biaxially stretching a composition comprising 30 to 90% by weight of the above-mentioned ultrahigh molecular polyethylene and 70 to 10% by weight of a low-density polyethylene.

When compared with the conventional fine porous polypropylene films, the above-mentioned films have succeeded in imparting a current cut-off function at a low temperature (e.g., 130° C.).

The basic idea of the prior art technology is to accomplish the cut-off of current at a low temperature by biaxially orienting the ultrahigh molecular polyethylene to maintain the film strength, and by adding a high-density polyethylene or a low-density polyethylene having widely ranging molecular weight distribution to form a structure which is softened or is melted at a low temperature.

It has been considered that the electric resistance of the separator increases as the fine pores are clogged. This phenomenon can be represented by when a polyethylene having wide range of molecular weight distribution and a polyethylene having a different molecular weight are blended, the polymer gradually melts over a wide range of temperatures. Therefore, obtaining a current cut-off function at a low temperature results in an increase in the internal resistance in a practicable range of, for example, about 100° C., which is not desirable from the standpoint of the battery.

Broadening of the distribution of the molecular weight is well used to increase the flowability at the time of molding high-molecular-weight polyethylene. As is understood from this fact, a film obtainable from a blend of broad molecular weight distribution polyethylenes or polyethylenes which become highly flowable after the beginning of melting is excellent because it enables shutting off of a current within a short period of time. But when thereafter, for some reason, the temperature is further elevated, since the film is highly flowable, the film which has been once closed has a risk of breaking.

That is, as far as a composition containing a polyethylene having broad range of molecular weight distribution is relied upon, it becomes necessary to manage to stop the battery function within a relatively narrow temperature range between a temperature at which the separator loses gas permeating property as the temperature of the battery rises and a temperature at which the separator is fluidized and breaks.

In order to reliably accomplish this, the internal resistance of the battery must have been increased in advance by suppressing gas permeating property of the separator sacrificing, however, the discharge performance of the battery.

Ideally, therefore, it is desired that the polyethylene separator suddenly loses gas permeating property when a maximum practicable temperature is exceeded, but is not fluidized and does not break even after it is melted. That is, by using a porous film obtained from a composition of polyethylenes, it is not possible at present to lower the temperature at which the porous film loses gas permeating property and to prevent the porous film from fluidizing and breaking after it is once melted.

SUMMARY OF THE INVENTION

The object of the present invention therefore is to provide a porous biaxially oriented film which satisfies the following requirements:

(1) The film exhibits excellent gas permeating property in a practicable temperature range, i.e., exhibits low electric resistivity in the presence of an electrolytic solution, excellent mechanical strength and, particularly, tensile strength, and is still isotropic;

(2) The film loses gas permeating property when a maximum practicable temperature is exceeded; and (3) Once melted, the film is fluidized very sparingly and is not broken, as well as to provide a separator for batteries using the above-mentioned film.

The present invention was accomplished in order to accomplish the above-mentioned object, and provides a porous biaxially oriented film obtained by melting and kneading a copolymer of an ethylene and a particular α-olefin in the presence of a plasticizer followed by cooling and solidification to obtain a sheet, biaxially stretching the sheet in the presence of part or all of the plasticizer and, then, extracting the whole plasticizer.

According to the present invention, there is provided a porous biaxially oriented film comprising an ethylene/α-olefin copolymer obtained by copolymerizing an ethylene and an α-olefin having 4 to 8 carbon atoms, the amount of the α-olefin being in a number of from 1.0 to 7.5 per 1000 carbon atoms of the copolymer, and an intrinsic viscosity [η] of the copolymer being from 3.5 to 10.0 dl/g, wherein said film has a microporous structure in which are uniformly dispersed microfibrils of the ethylene/α-olefin copolymer, and when heat-treated at 160° C. in a constrained state and observed at room temperature, said film loses air permeating property due to the loss of porosity but still retains the structure which is based upon the microfibrils and the temperature at which the film breaks after having lost gas permeating property is not lower than 170° C.

The present invention further provides a porous biaxially oriented film constituted by microfibrils having the above-mentioned features and satisfying the requirements that:

(a) the tensile strength is not smaller than 900 kg/cm² in all directions;

(b) the gas permeability is from 50 to 1000 sec/100 cc;

(c) the temperature at which the gas permeating property is lost is not higher than 150° C.

According to the present invention, furthermore, there are provided a porous biaxially oriented film constituted by microfibrils obtained by mixing an ethylene/α-olefin copolymer and a plasticizer compatible with said copolymer in a molten state, said ethylene/α-olefin copolymer comprising an ethylene having an intrinsic viscosity [η] of from 3.5 to 10.0 dl/g and an α-olefin having 4 to 8 carbon atoms, the amount of the α-olefin being in a number of from 1.0 to 7.5 per 1000 carbon atoms of the copolymer, followed by cooling and solidification to obtain a sheet, biaxially stretching said sheet in a state where all or part of the plasticizer is left in said sheet, and removing the remaining plasticizer after the stretching, as well as a porous biaxially oriented film constituted by microfibrils satisfying the requirements that:

(a) the tensile strength is not smaller than 900 kg/cm² in all directions;

(b) the gas permeability is from 50 to 1000 sec/100 cc;

(c) the temperature at which the gas permeating property is lost is not higher than 150° C.; and (d) the temperature at which the film breaks after having lost the gas permeating property is not lower than 170° C.

There is further provided a separator for batteries comprising the biaxially oriented film of the above-mentioned embodiments.

The term "biaxially oriented" or "biaxial orientation" in this specification indicates the state of micro-crystalline arrangement of polymer molecule chains in the film which is observed on the film obtained by stretching the unstretched green film composed of the ethylene α-olefin copolymer having intrinsic viscosity [η] of more than 3.5 used in the present invention, at the temperature below the melting point of the polymer in the widthwise and the lengthwise direction, individidually or simultaneously in stretching ratio of 3 (i.e., three times as much as the unstretched green film).

In this specification, the intrinsic viscosity [η] is that measured in a decalin solvent at 135° C. based on ASTM D1601.

In this specification, the tensile strength was measured by using a tensile tester, Tensilon (Model RTM100), manufactured by Orientec Co., at room temperature (23° C.). The shape of the sample was a dumbbell specimen according to JIS No. 1, the distance between the clamps was 80 mm, and the tension speed was 20 mm/min. The tensile modulus of elasticity is an initial tangential modulus of elasticity, and the tensile strength is a stress at a breaking point. The sectional area required for the calculation was found by practically measuring the thickness of the film. The tensile strength at a high temperature was measured by containing the clamp portions in a high-temperature vessel and setting the ambient temperature at 150° C. Procedure for reading out of data values from the stress-strain curve and subsequent caluculation are based on ASTM D638.

DETAILED DESCRIPTION OF THE INVENTION

Figure 1:
FIG. 1 is an electron microphotograph (magnification: 10,000) of a film obtained in Example 3 before it was heat-treated at 160° C.

The present inventors have discovered that the aforementioned problems can be solved by using a porous biaxially oriented film which comprises an ethylene/α-olefin copolymer of an ethylene having an intrinsic viscosity [η] of from 3.5 to 10.0 dl/g and an α-olefin having 4 to 8 carbon atoms, the amount of the α-olefin being in a number of from 1.0 to 7.5 per 1000 carbon atoms of the copolymer and which, particularly, comprises a copolymer having a weight-average molecular weight/number-average molecular weight (Mw/Mn) ratio of not larger than 13, the porous biaxially oriented film being constituted by microfibrils and satisfying the requirements that:

(a) the tensile strength is not smaller than 900 kg/cm² in all directions;

(b) the gas permeability is from 50 to 1000 sec/100 cc;
(c) the temperature at which the gas permeating property is lost is not higher than 150° C.;
(d) the temperature at which the film breaks after having lost the gas permeating property is not lower than 170° C.; and
(e) the film retains the structure which is based upon the microfibrils when it is heat-treated at 160° C. under the constrained state and is observed at room temperature.

The "biaxial orientation" used in this application denotes the orientation of crystals obtained by stretching an unstretched base sheet composed of an ethylene-α-olefin copolymer having a molecular weight represented by an intrinsic viscosity of at least 3.5 at a stretch ratio of at least 3 times, logitudinally and laterally at the melting point or below.

Based on this discovery, the inventors learned that the porous biaxially oriented film can be desirably used as a separator for batteries and have accomplished the present invention.

The porous biaxially oriented film of the present invention is obtained by mixing a plasticizer and a copolymer of an ethylene having an intrinsic viscosity $[\eta]$ of from 3.5 to 10.0 dl/g, preferably from 5.0 to 10.0 dl/g and more preferably from 7.0 to 9.0 dl/g and an α-olefin having 4 to 8 carbon atoms, and biaxially stretching the mixture.

When the intrinsic viscosity $[\eta]$ is smaller than 3.5 dl/g, the polymer fails to exhibit strength despite an increase in the drawing ratio, and when the intrinsic viscosity $[\eta]$ is larger than 10.0 dl/g, on the other hand, the copolymer becomes poorly compatible with the plasticizer. Therefore, the copolymer loses uniformity when it is formed into a film.

The high molecular ethylene/α-olefin copolymer used in the present invention for example is obtained by slurry-polymerizing an ethylene and an α-olefin having 4 to 8 carbon atoms by using a Ziegler catalyst.

As the α-olefin having 4 to 8 carbon atoms, there can be exemplified butene-1, pentene-1, 4-methylpentene-1, hexene-1 and octene-1 which may be used in a single kind or in a combination of two or more kinds. It is, however, desired that an α-olefin having 6 to 8 carbon atoms include at least 4-methylpentene-1, hexene-1 or octene-1. The amount of the α-olefin comonomer is in a number of from 1.0 to 7.5 and, preferably, from 1.0 to 5.0 per 1000 carbon atoms in the copolymer.

When the amount of the α-olefin in the polymer is smaller than 1.0 per 1000 carbon atoms, the film tends to be fluidized when the melting point is exceeded and is not improved in its resistance against being broken. When the amount is larger than 7.5, on the other hand, the mechanical strength may fail to reach the desired level.

The melting point of the starting ethylene/α-olefin copolymer (melting point of the second run observed by a differential scanning calorimeter that will be described later) is desirably not higher than 134° C., and more preferably, not higher than 130° C. though it may vary depending upon the amount of the α-olefin that is copolymerized. Though there is no particular limitation, the lower limit of the melting point of the starting ethylene/α-olefin copolymer (A) is 120° C. from such a standpoint that the ethylene/(α-olefin copolymer (A) that is used as a separator film does not affect performance of the battery when it is used in the practicable maximum temperature range (105° C.). Unless otherwise stated, the melting point in this specification is found from the endothermic peak of a thermograph measured by using the differential scanning calorimeter (DSC) in compliance with ASTM D3417.

The molecular weight distribution of the polymer is expressed by a ratio of weight-average molecular weight (Mw)/number-average molecular ratio (Mn). The molecular weight distribution of the starting ethylene/α-olefin copolymer is better narrow since it melts or loses gas permeating property within a narrow range. A desired range of molecular weight distribution in terms of Mw/Mn is not larger than 13 and, preferably, not larger than 10. It is not desired to increase the molecular weight distribution by blending.

It is desired that the plasticizer (B) used as a fluidity-improving agent has a boiling point which is higher than the melting point of the ethylene/α-olefin copolymer (A) and, preferably, higher by more than +10° C. than the melting point of the ethylene/α-olefin (A), and has a melting point which is not higher than 110° C. Upon melting and kneading at a temperature of not lower than 120° C., the plasticizer (B) becomes compatible with the ethylene/α-olefin copolymer (A) and forms a homogeneous mixture. Clasifying roughly, the plasticizer (B) is selected from the two groups B1 and B2.

First, the group B1 includes a hydrocarbon plasticizer having a molecular weight of not larger than 2000 which is a solid at room temperature and is, preferably, a paraffin wax having a molecular weight of from 400 to 1000 from the standpoint of dispersion property. Concrete examples of the paraffin wax include n-alkanes having not less than 22 carbon atoms such as docosane, tricosane, tetracosane, triacontane, etc. or a mixture of lower n-alkanes containing the above-mentioned compounds as chief components, so-called paraffin wax fractionated from petroleum, medium- to low-pressure polyethylene wax which is a low molecular polymer obtained by polymerizing an ethylene and other α-olefin, a high-pressure polyethylene wax, an ethylene-copolymerized wax, wax having decreased molecular weight obtained by thermally degrading polyethylene such as medium- to low-pressure polyethylene or high-pressure polyethylene, and oxidized wax and modified wax which are oxides of wax and modified products of wax.

The group B2 includes aliphatic compounds having not less than 15 carbon atoms and oxygen-containing bonding groups such as hydroxyl groups. Concrete examples include alcohols such as cetyl alcohol, heptadecyl alcohol, stearyl alcohol, seryl alcohol, and behenyl alcohol; ethers such as dioctyl ether, didecyl ether, and dodecyl ether; ketones such as methyltetradecyl ketone, didodecyl ketone, n-propylhexadecyl ketone, and dioctadecyl ketone; aliphatic compounds of esters of octyl laurate, ethyl palmitate, butyl stearate and octyl stearate, petroleum resin having an average molecular weight of from 500 to 2000 comprising dicyclopentadiene as a chief component, and alicyclic compound such as hydrogenated petroleum resin.

In the present invention, the amount of the α-olefin in the ultrahigh molecular ethylene/α-olefin copolymer is quantitatively measured by using an infrared-ray spectrophotometer (manufactured by Nihon Bunko Kogyo Co.). That is, absorbancy at 1378 $cm^{-1}$ was measured that represents deformation vibration of a methyl group of α-olefin in the ethylene chain, from which the number of methyl branches was calculated per 1000 carbon atoms using an calibration curve prepared from a model compound by using a 13C nuclear magnetic resonance device.

Next, described below is how to produce the porous biaxially oriented film of the present invention.

First, the ethylene/α-olefin copolymer (A) that is a starting material of the porous biaxially oriented film of the present invention in an amount of from 15 to 80% by weight, preferably from 20 to 60% by weight and, more preferably, from 25 to 50% by weight and the plasticizer (B) in an amount of from 85 to 20% by weight, preferably, from 80 to 40% by weight, and more preferably, from 75 to 50% by weight, are homogeneously mixed together, melted, molded, and solidified by cooling to obtain an unstretched sheet.

The ethylene/α-olefin copolymer (A) and the plasticizer (B) are mixed together by using, for example, a Henschel mixer, V-blender, ribbon blender, or tumbler blender and are then melted and kneaded by using a screw extruder such as a single screw extruder or twin screw extruder, kneader or Banbury mixer at a temperature which is usually higher than the melting point but is not higher than 300° C. When the temperature is not higher than the melting point of the ethylene/α-olefin copolymer, the kneading is not accomplished homogeneously because of the high viscosity of the mixture. When the kneading is effected at a temperature in excess of 300° C., on the other hand, the ethylene/α-olefin copolymer is thermally deteriorated, which is not desirable. Particularly preferably, the melt-kneading is effected within a temperature range of from 180 to 250° C.

The mixture is molded into an unstretched sheet by, usually, extrusion molding using an extruder equipped with a T-die. Compression molding may be employed as well, though the productivity decreases. The melt-kneading may be effected in advance prior to forming the sheet, or the unstretched sheet may be continuously extruded through the die while effecting the melt-kneading using the screw extruder or a similar extruder. When the unstretched sheet is obtained by compression molding, the melt-kneading is separately effected in advance, and the shape of the sheet is imparted by the compression molding. It is desired that the unstretched sheet has a thickness of from 0.05 mm to 5 mm so that it can be gripped by chucks during the stretching.

The obtained unstretched sheet is then stretched. Though removal of the plasticizer (B) will be described later in detail, the stretching must be effected in a state where the plasticizer that was substantially added at least partly remains in the unstretched sheet. When the plasticizer is removed in substantially the whole amount prior to the stretching, the obtained porous biaxially oriented film fails to possess a uniform porous structure, but instead acquires a veined nonuniform porous structure of pores having irregular sizes, which is not desirable. It is desired that the obtained sheet is biaxially stretched simultaneously or successively in the longitudinal and transverse directions at a temperature of from 60 to 140° C. The lower limit of the stretching temperature is 60° C. When stretched within this temperature range, the film acquires a uniform porous structure.

When the temperature is lower than 60° C., only a low stretching ratio is accomplished and, as a result, it becomes difficult to obtain excellent tensile strength. Moreover, the tensile stress becomes so large as to impair the stretching operation. When the stretching temperature is higher than 140° C., little tensile stress is exerted on the ethylene/α-olefin copolymer, making it difficult to obtain excellent tensile strength.

The unstretched sheet that is prepared can be biaxially stretched simultaneously or successively by the tenter method, or can be stretched successively, first, in the longitudinal direction by a pair of rolls and then in the transverse direction by the tenter clips. When the stretching ratio is more than 10 times in both the longitudinal direction and the transverse direction, it is desired to employ multi-stage stretching.

In this case, the stretching temperature may be raised from the preceding stretching step to the succeeding drawing step within a range not exceeding 160° C.

The extruded unstretched sheet may be stretched just when the molten sheet extruded through the die is cooled down to a stretching temperature. According to the present invention, however, the sheet-like molten mixture is once cooled and solidified together with the plasticizer (B) that is added, heated again, and is stretched within the above-mentioned stretching temperature together with at least part of the plasticizer (B).

The heating medium during the stretching is usually the air. When it is attempted to remove the plasticizer (B) during the stretching, however, a solvent (C) is selected that has a relatively high boiling point, is not compatible with the ethylene/α-olefin copolymer at the stretching temperature but is compatible with the plasticizer (B).

The ratio of biaxial stretching is, usually, 3 or more times and, preferably, 4 to 20 times in the longitudinal direction and 3 or more times and, preferably, 4 to 20 times in the transverse direction, and is more than 10 times in terms of an area ratio.

When it is desired to prepare a very thin film, it is desired that the stretching ratio is not smaller than 20 times in both the longitudinal direction and the transverse direction. When the stretching ratio exceeds 20 times, the thickness of the high molecular biaxially stretched film prepared by stretching becomes smaller than 1/400 though it may vary depending upon the porosity and the composition of the unstretched sheet, lending itself well for preparing a very thin film (not thicker than $1\mu$), which at present, however, is not suited for the production of a film as a separator which is the principal object of the present invention except special cases.

Next, the plasticizer (B) is removed substantially in whole amount from the film. Though there is no particular limitation in the step of removal, the plasticizer (B) may be partly removed from the unstretched sheet before it is being stretched and the unstretched sheet may then be stretched, or the plasticizer (B) may be removed partly or entirely while the unstretched sheet is being stretched, or the plasticizer (B) may be entirely removed after the unstretched sheet has been stretched.

From the standpoint of efficiency in removal of the plasticizer, however, it is most desired to permit part or all of the plasticizer (B) to stay during the stretching and remove part or all of the remaining plasticizer after the film has been stretched to have a decreased thickness. It is desired that the plasticizer (B) is removed at the stretching temperature during the stretching step and is removed at temperatures of not higher than 60° C. in other steps.

For the plasticizers (B) of the group B1, preferred examples of the solvent (C) for extracting and removing the plasticizer (B) are hydrocarbon low molecular solvents such as n-hexane, cyclohexane, n-heptane, n-octane, n-decane and n-dodecane. For the plasticizers of the group B2, examples of the solvent include alcohols such as methyl alcohol, ethyl alcohol, and isopropyl alcohol; aromatic hydrocarbons, chloroform, acetone, carbon tetrachloride, and mixtures thereof.

When the plasticizer (B) is partly removed from the unstretched sheet in a state where the sheet is not constrained (i.e., an end is free), the unstretched sheet may shrink. When the shrinkage is not larger than 30% in terms of the area, the stretching properties are not lost in the subsequent step of biaxial stretching. The unstretched sheet, however, may be warped and wrinkled which is not desirable from the standpoint of operation since the unstretched sheet may not be properly clipped when it is being fitted to the tenterclips.

Here, that the plasticizer (B) is partly removed from the unstretched sheet is meant that the plasticizer is left unremoved in an amount, at least, equi-amounts of the ethylene/α-olefin copolymer in the sheet, even in the most severe removal case.

It is therefore desired that the plasticizer is extracted and removed from the unstretched sheet in a state where at least one side thereof is constrained (i.e., an end is fixed).

When the plasticizer is to be extracted from the film after the stretching, it is desired that at least one side of the film is constrained (i.e., an end is fixed) like when the plasticizer (B) is removed from the unstretched sheet. After this step, the plasticizer (B) must have been removed in substantially the whole amount.

The thickness of the film obtained by the present invention is adjusted depending upon the thickness of the sheet before being stretched, the composition ratio of the plasticizer, the stretching ratio and the porosity of the obtained sheet. From the standpoint of operability at the time of preparing the film and easy handling of the film after it has been prepared, however, it is desired that the film has a thickness of from 1 to 100 μm and, preferably, from 4 to 50 μm.

The film thickness is measured by using a film thickness-measuring machine, Miniacs, Model DH-150 manufactured by Tokyo Seimitsu Co.

The film obtained by the present invention has a porosity of from 20 to 80% and, preferably, from 30 to 60%. When the porosity of the film is not larger than 20%, good air permeating property which is the feature of the film of the invention is not obtained. When the porosity is larger than 80%, the aforementioned tensile strength of the film is not obtained.

The porosity value is obtained by the method as follows: weighing the sample weight, and assuming that the density of the sample film being 0.95 g/cm³, calculating the hypothetical thickness of the film as plane compact film having no porosity, and then, figuring out the porosity by using the measured thickness value obtained with above-mentioned thickness-measuring machine and the hypothetical thickness value.

$$\text{Porosity (vol. \%)} = \frac{TO - TW}{TO} \times 100$$

wherein TO denotes the practical thickness of the film found by using the thickness measuring machine, and TW denotes the thickness of the film having a porosity of 0% as calculated from the weight.

The gas permeating property of the film obtained by the present invention can be evaluated by taking a measurement using Gurley densometer. Desirably, the gas permeability is from 50 to 1000 sec./100 cc and, more desirably, from 50 to 600 sec./100 cc.

The gas permeating property is measured by mounting the film on the standard Gurley densometer in compliance with ASTM D726. That is, the time (seconds) is measured that is required for 100 cc of the air to flow through the film of an area of one square inch under a standard pressure differential (pressure differential between both surfaces of the film) of 12.2 inches of water.

After the treatment for extracting and removing the plasticizer (B), the amount of the plasticizer (B) remaining in the film can be confirmed relying upon the melting point by using a differential scanning calorimeter (DSC) when the plasticizer (B) has crystalline property, or can be confirmed from the reduction of its weight by using the Soxhlet's extractor by extracting the unstretched sheet with a suitable solvent which does not dissolve the ethylene/α-olefin copolymer but dissolves the plasticizer (B), such as boiling n-hexane when the plasticizer is a paraffin wax.

According to the present invention, a variety of additives that are usually used by being added to the polyolefin, such a heat stabilizer, aging stabilizer, lubricating agent, anti-blocking agent, slipping agent, pigment, dye, surfactant, inorganic filler, etc. may be blended in amounts that do not impair the object of the present invention in addition to the ethylene/α-olefin copolymer (A) and the plasticizer (B) prior to preparing the film.

Depending upon the uses, furthermore, the obtained film may be subjected to the heat treatment in order to improve dimensional stability, tensile modulus of elasticity and tensile strength. The heat treatment is desirably carried out by once cooling the film that has been drawn down to a temperature of not higher than 60° C. and, then, heat-treating the film at a temperature within a range of from 80 to 170° C. in a state where at least one side thereof is constrained. Prior to executing this step, the plasticizer (B) must have been substantially removed.

The heating medium for executing the heat treatment is a gas such as air or nitrogen gas, or is water which does not dissolve or modify polyethylene, or is a liquid such as diethylene glycol or triethylene glycol. Preferred treating temperature is from about 140 to about 160° C. to which temperature only, however, the invention is in no way limited as a result of selecting the treating time. Through the above-mentioned treatment, the film which has a slightly lowered porosity becomes thinner than it was before being treated.

Structure and properties of the film obtained by the present invention

Figure 2:
FIG. 2 is an electron microphotograph (magnification: 10,000) of the film obtained in Example 3 after it was heat-treated at 160° C. in the constrained condition.

The film of the present invention is semi-transparent or is opaque, but exhibits lustrous white color though it may vary depending upon the thickness. The film has a structure in which fibrils of the ethylene/α-olefin copolymer are uniformly dispersed like the structure of pulp when the paper is just made. This structure can be easily observed using a scanning electron microscope at a magnification of 3,000 to 10,000 times. FIG. 1 is a scanning electron microphotograph (magnification: 10,000) of a film obtained in Example 3 that will be described later before being heat-treated at 160° C. FIG. 2 is a scanning electron microphotograph (magnification: 10,000) of the film of Example 3 after being heat-treated at 160° C. in the constrained state. The greatest feature of the film obtained by the present invention is that it does not flow even when it is once melted, and after being cooled and solidified, the film exhibits the structure which is based upon the microfibrils before being melted as observed using the electron microscope.

Figure 3:
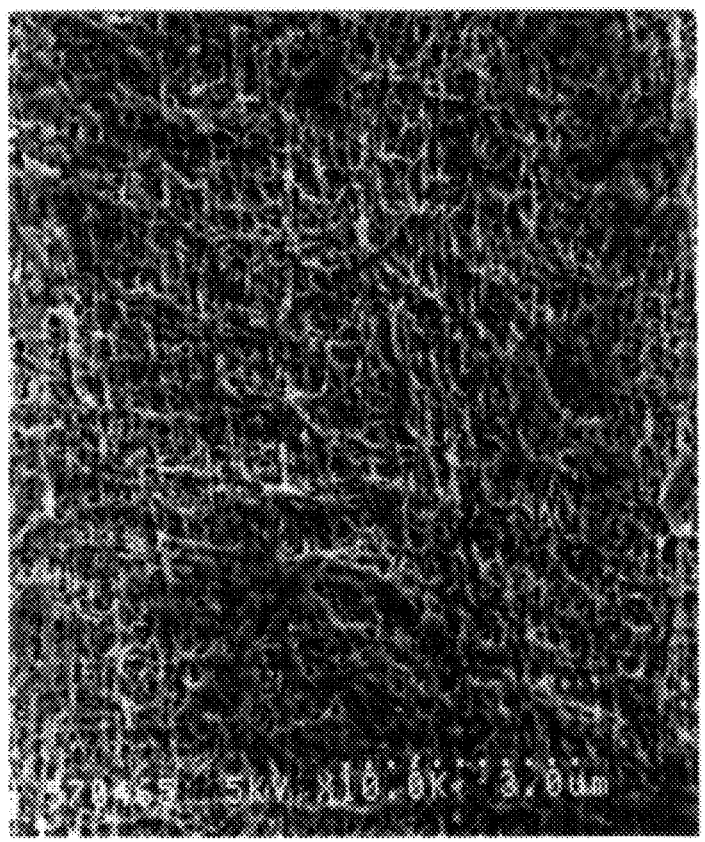
FIG. 3 is an electron microphotograph (magnification: 10,000) of a film obtained in Comparative Example 9 before it was heat-treated at 160° C.
Figure 4:
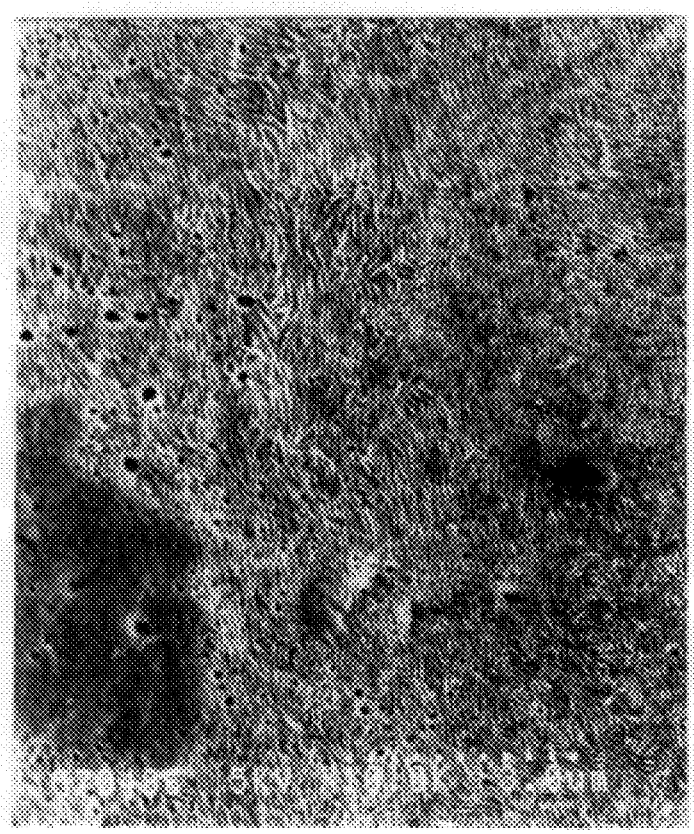
FIG. 4 is an electron microphotograph (magnification: 10,000 times) of the film obtained in Comparative Example 9 after it was heat-treated at 160° C. in the constrained condition.

When the polyethylene porous film of the above-mentioned prior art is once melted and is, then, cooled and crystallized, there is exhibited a so-called sheaf-like lamella structure which is quite different from the porous structure as observed using an electron microscope. FIG. 3 is a scanning electron microphotograph (magnification: 10,000) of a film obtained in Comparative Example 9 before being heat-treated at 160° C. FIG. 4 is a scanning electron microphotograph (magnification: 10,000) of the film obtained in Comparative Example 9, i.e., of the film of FIG. 3 after heat-treated at 160° C. under the constrained state. As will be obvious from the difference between FIG. 3 and FIG. 4, a new structure is formed since the molecules are fluidized to move freely. The molten film which is fluidized is subject to be easily broken or damaged upon the application of a very small external force.

In the case of the porous film comprising the ethylene/α-olefin copolymer obtained according to the present invention, on the other hand, the molecules are entangled and locked by side chains of the α-olefin in the molten state and are not fluidized, exhibiting excellent resistance against fluidization and breakage.

According to the present invention as described above, there is obtained a porous biaxially oriented film having a tensile strength of not smaller than 900 kg/cm$^2$ in all directions of the film and a porosity of 20 to 80%.

As the ambient temperature rises, the film obtained by the present invention loses gas permeating property within a predetermined temperature range in short periods of time. The temperature at which the gas permeating property is lost is from 110 to 150° C. Even after the polyethylene is melted, the film maintains its shape and excellent strength. Even when the ambient temperature rises, therefore, the film is not broken and maintains a non-permeating state. The film is damaged or broken when the temperature becomes higher than 170° C.

Whether the film that was melted was fluidized or broken is judged as described below.

That is, the films were fixed to a metal frame having an inner diameter of 5 cm, thrown into a silicone oil bath maintained at a predetermined temperature, and were held for 5 minutes. The samples that were visually observed as broken were regarded to be the ones that were fluidized and broken. The samples that were not visually observed as broken were taken out from the bath, left to cool, washed with hexane, and were dried. Then, the films were measured for their gas permeating property, and the films that have lost gas permeating property were observed through an electron microscope at a magnification of 10,000 times. The samples that exhibited pores of not smaller than 1 μm were regarded to be the broken ones and the samples that exhibited sheaf-like lamella were regarded to be fluidized. The samples that have lost gas permeating property but possessed the same structure as before being treated were regarded to be the ones having good resistance against fluidity and breakage.

The film was measured for its volume resistivity and temperature at which it lost gas permeating property in accordance with the methods described below.

That is, a solution of an anhydrous lithium perchlorate of 1 mole/liter was prepared in a dry nitrogen atmosphere (water content of smaller than 50 ppm) using, as a solvent, propylene carbonate that was dehydrated with Molecular Sieves (4A manufactured by Wako Junyaku Co.). The film was impregnated with this solution under reduced pressure. The film was sandwiched by nickel electrodes, and the volume resistivity of the film was measured by using an impedance meter, Model D-52S, manufactured by Mita Musen Kenkyujo Co. under elevated temperature conditions. The device and the measuring method were in compliance with the report by F. C. Laman et al., J Electrochem. Soc., Vol. 140, PP.51–53, 1993. The volume resistivity at ordinary temperature (23° C.) was regarded to be a volume resistivity of the film and a temperature at which the resistivity suddenly increased was regarded to be a temperature at which the film lost gas permeating property.

The volume resistivity may vary depending upon the shape and structure of the electrode material, kind of electrolytic solution and kind of electrolyte. With the above-mentioned measuring method, however, it is considered that the film is usable as a separator for batteries when the volume resistivity is not larger than 80 Ω-cm$^2$/piece.

The film provided by the present invention has excellent tensile strength. When used as a separator for batteries, therefore, the film withstands mechanical stress during the production of batteries and contributes to decreasing the percentage of defects. With the film being incorporated in a battery, in case the battery temperature is raised due to short-circuiting, the film quickly loses gas permeating property causing the battery to discontinue its function. Moreover, in case the temperature is raised due to some other reasons, the film is not broken and offers improved safety.

EXAMPLES

The present invention will be described in further detail by way of Examples to which, however, the invention is in no way limited. In the specification, percent is all by weight (% by weight) unless otherwise stated.

Preparation of a starting polyethylene used as a sample and an ethylene/α-olefin copolymer An ethylene/α-olefin copolymer was prepared by the slurry polymerization by using a Ziegler catalyst and hexane as a solvent. When the copolymer to be used was a butene-1 or 4-methylpentene-1, it was blended in a required amount as a gas mixture with ethylene, and was fed to the polymerizing apparatus. When the copolymers were hexene-1 or octene-1, the copolymers were added at one time into hexene prior to effecting the polymerization. Thereafter, ethylene was fed simultaneously with the catalyst that was added to carry out the polymerization. The pressure of polymerization was adjusted to be 5 kg/cm$^2$G. The molecular weight was controlled by controlling the amount of hydrogen added prior to the polymerization and the temperature of polymerization. Isopropyl alcohol was added to the polymer slurry after the polymerization to inactivate the catalyst. The polymer was then dried and was used as a powdery sample for the following experiments.

Preparation of porous biaxially oriented film

A powder of ethylene/α-olefin copolymer and a powder of paraffin wax were homogeneously mixed together. The obtained powdery mixture was melted and kneaded at 200° C. for 10 minutes by using a twin screw-type melt-kneader, Labo plast-mill, Model 20 R 200 manufactured by Toyo Seiki Mfg. Co. to obtain a homogeneous molten mixture. The rotating speed of the screw was 50 rpm.

The molten mixture was taken out in a molten state, placed between a pair of press plates, adjusted for its thickness using a 1 mm-thick metal frame, and then immediately molded into a sheet by sandwiching between the hot plates heated at 200° C. in a hot compression molding machine. After being pressed by the hot compression machine for 5 minutes, the molten mixture sandwiched between the press plates was taken out, together with the metal frame, sandwiched by a cold compression molding machine of which the cooling plates are maintained at 20° C., compressed, cooled and solidified to obtain a sheet.

Then, the obtained sheet was biaxially stretched simultaneously and successively to obtain a biaxially stretched film. The biaxially stretching machine was of the tenter clip type, heavy model, manufactured by Toyo Seiki Mfg. Co., and the stretching rate was 1.5 m/min.

Then, to extract paraffin wax from the obtained film, the film was secured at its four sides to the metal frame, left to stand in an n-decane bath maintained at a temperature of 60° C. for about 30 minutes and was then washed with n-hexane at room temperature, left to stand, and dried. The dry film that was obtained was observed using the differential scanning calorimeter but no melting peak of paraffin wax was observed at 69° C.

Examples 1 to 6

By using copolymers having properties shown in Table 1 as starting materials, the biaxially oriented films were prepared by the method described above. The ethylene/α-olefin copolymer and the paraffin wax were mixed at a ratio of 30:70, and the films were drawn at 110° C. The stretching ratio was 6 times in both the longitudinal direction and the transverse direction.

TABLE 1

|  | Intrinsic viscosity (η)dl/g | Co-polymerization monomer | Number of copolymer per 1000 C atoms | Melting point (°C.) | Molecular weight distribution (Mw/Mn) |
|---|---|---|---|---|---|
| Example 1 | 7.9 | a | 2.4 | 127.1 | 8.4 |
| Example 2 | 8.8 | a | 6.0 | 122.7 | 8.8 |
| Example 3 | 7.9 | b | 3.1 | 125.3 | 7.5 |
| Example 4 | 8.1 | c | 2.6 | 131.6 | 7.7 |
| Example 5 | 7.6 | d | 2.4 | 131.2 | 7.2 |
| Example 6 | 10.0 | d | 2.0 | 132.9 | 8.4 |
| Comp. Ex. 1 | 8.5 | a | 8.6 | 121.8 | 9.8 |
| Comp. Ex. 2 | 11.2 | a | 1.2 | 132.5 | 9.5 |
| Comp. Ex. 3 | 10.4 | a | 2.7 | 130.7 | 9.8 |
| Comp. Ex. 4 | 8.8 | e | 1.3 | 132.0 | 5.3 |
| Comp. Ex. 5 | 10.4 | — | — | 134.7 | 7.2 |
| Comp. Ex. 6 | 15.6 | e | 1.2 | 132.9 | 8.4 |
| Comp. Ex. 7 | 14.0 | — | — | 137.4 | 6.0 |
| Comp. Ex. 8 | 2.3 | a | 4.0 | 132.0 | 6.2 |
| Comp. Ex. 9 | 6.2 | a | 1.3 | 132.9 | 14.3 |
| Comp. Ex. 10 | 13.2 | c | 1.7 | 132.5 | — |
| Comp. Ex. 11 | 14.7 | d | 1.2 | 132.5 | — |

Comp. Ex.: Comparative Example

In Table 1, a represents butene-1, b represents 4-methylpentene-1, c represents hexene-1, d represents octene-1 and e represents propylene.

Table 2-1 shows properties of the obtained films, and Table 3-1 shows results of stability of the films that were heated.

Comparative Examples 1 to 7

The films were prepared in the same manner as in Examples 1 to 6 but using copolymers shown in Table 1 as starting materials.

Tables 2-2 and 2-3 show properties of the obtained films, and Table 3-2 shows the results of stability of the films that were heated.

Comparative Examples 8 and 9

Films were prepared in the same manner as in Examples 1 to 6 but using copolymers shown in Table 1 as starting materials and mixing the ethylene/α-olefin copolymer and the paraffin wax at a ratio of 40:60. Here, the starting material of Comparative Example 9 was a blend of the polyethylene of Comparative Example 7 and the polyethylene of Comparative Example 8 at a ratio of 1:2. The starting material of Comparative Example 8 was a high-density polyethylene available in the marketplace.

Table 2-3 shows properties of the obtained films, and Table 3-3 shows the results of stability of the films that were heated.

Comparative Examples 10 and 11

The starting materials and sheets were prepared in the same manner as in Examples 1 to 6 but using copolymers shown in Table 1 as starting materials. However, the sheets could not be stretched.

TABLE 2-1

| Sample No. | Stretching method | Thickness of film (μ) | Porosity (%) | Gas permeability (sec/100 cc) | Tensile strength (kg/cm²) | Elongation (%) | Volume resistivity (Ωcm²/piece) | Temp. at which gas Permeability is lost (°C.) |
|---|---|---|---|---|---|---|---|---|
| Example 1 | simultaneously | 20.0 | 47.2 | 419 | 2780 | 131 | 31 | 133 |
|  | successively | 19.0 | 46.3 | 646 | MD: 3260 | 100 | 81 | 141 |
|  |  |  |  |  | TD: 2660 | 134 |  |  |
| Example 2 | simultaneously | 19.0 | 40.2 | 440 | 2000 | 128 | 25 | 137 |
|  | successively | 18.7 | 42.9 | 620 | MD: 2930 | 138 | 81 | 136 |
|  |  |  |  |  | TD: 2360 |  |  |  |
| Example 3 | simultaneously | 17.0 | 39.5 | 546 | 2490 | 140 | 81 | 136 |
|  | successively | 17.4 | 42.0 | 592 | MD: 3470 | 116 | 20 | 136 |
|  |  |  |  |  | TD: 2630 | 135 |  |  |
| Example 4 | simultaneously | 21.0 | 47.8 | 406 | 2880 | 134 | 81 | 139 |
|  | successively | 19.9 | 49.0 | 425 | MD: 3370 | 115 | 24 | 144 |
|  |  |  |  |  | TD: 3290 | 137 |  |  |
| Example 5 | simultaneously | 21.0 | 49.0 | 467 | 2760 | 127 | 73 | 136 |
|  | successively | 20.2 | 50.8 | 478 | MD: 3480 | 116 | 21 | 136 |
|  |  |  |  |  | TD: 2320 | 131 |  |  |
| Example 6 | simultaneously | 23.1 | 45.3 | 615 | 2990 | 117 | 40 | 139 |
|  | successively | 22.2 | 43.9 | 546 | MD: 3600 | 112 | 59 | 144 |
|  |  |  |  |  | TD: 3250 | 146 |  |  |

When the films were biaxially stretched simultaneously, the tensile strengths were nearly the same in all directions and, hence, representative values are described. When biaxially stretched successively, the direction in which the film was first stretched was denoted as MD direction and the direction in which the film was then stretched perpendicularly thereto was denoted as TD direction. In checking the tensile strengths in all directions, it was confirmed that a maximum value was exhibited in the MD direction and a minimum value was exhibited in the TD direction. In this case, therefore, the strengths in both the MD direction and the TD direction were described.

TABLE 2-2

| Sample No. | Stretching method | Thickness of film (μ) | Porosity (%) | Gas permeability (sec/100 cc) | Tensile strength (kg/cm²) | Elongation (%) | Volume resistivity (Ωcm²/piece) | Temp. at which gas permeability is lost (°C.) |
|---|---|---|---|---|---|---|---|---|
| Comp. Ex. 1 | simultaneously | 17.0 | 39.6 | 527 | 2120 | 130 | 20 | 131 |
|  | successively | 14.0 | 38.3 | 507 | MD: 2510 | 97 | 49 | 127 |
|  |  |  |  |  | TD: 2090 | 152 |  |  |
| Comp. Ex. 2 | simultaneously | 22.7 | 40.9 | 506 | 3150 | 113 | 34 | 148 |
|  | successively | 18.8 | 45.3 | 415 | MD: 3360 | 87 | 54 | 149 |
|  |  |  |  |  | TD: 3570 | 122 |  |  |
| Comp. Ex. 3 | simultaneously | 20.7 | 46.8 | 433 | 2740 | 120 | 51 | 141 |
|  | successively | 21.1 | 47.1 | 651 | MD: 2990 | 90 | 20 | 141 |
|  |  |  |  |  | TD: 3190 |  |  |  |
| Comp. Ex. 4 | simultaneously | 22.8 | 50.2 | 410 | 3830 | 113 | 180 | 149 |
|  | successively | 24.8 | 55.6 | 420 | MD: 3940 | 128 | 80 | 152 |
|  |  |  |  |  | TD: 3910 | 136 |  |  |
| Comp. Ex. 5 | simultaneously | 26.4 | 58.6 | 343 | 3860 | 76 | 35 | 154 |
|  | successively | 24.3 | 55.9 | 347 | MD: 3680 | 116 | 21 | 158 |
|  |  |  |  |  | TD: 3890 | 113 |  |  |

When the films were biaxially stretched simultaneously, the tensile strengths were nearly the same in all directions and, hence, representative values are described. When biaxially stretched successively, the direction in which the film was first stretched was denoted as MD direction and the direction in which the film was then stretched perpendicularly thereto was denoted as TD direction. In checking the tensile strengths in all directions, it was confirmed that a maximum value was exhibited in the MD direction and a minimum value was exhibited in the TD direction. In this case, therefore, the strengths in both the MD direction and the TD direction were described.

TABLE 2-3

| Sample No. | Stretching method | Thickness of film (μ) | Porosity (%) | Gas permeability (sec/100 cc) | Tensile strength (kg/cm²) | Elongation (%) | Volume resistivity (Ωcm²/piece) | Temp. at which gas permeability is lost (°C.) |
|---|---|---|---|---|---|---|---|---|
| Comp. Ex. 6 | simultaneously | 17.4 | 49.7 | 222 | 2840 | 73 | 22 | 153 |
|  | successively | 15.5 | 48.4 | 259 | MD: 1700 | 73 | 30 | 152 |
|  |  |  |  |  | TD: 1690 |  |  |  |
| Comp. Ex. 7 | simultaneously | 26.7 | 53.3 | 596 | 1890 | 130 | 41 | 148 |
|  | successively | 26.8 | 48.1 | 622 | MD: 2200 | 125 | 31 | 150 |
|  |  |  |  |  | TD: 1800 | 110 |  |  |
| Comp. Ex. 8 | simultaneously | 32.8 | A6.8 | 620 | 670 | 76 | 32 | 130 |
| Comp. Ex. 9 | simultaneously | 25.4 | 53.2 | 730 | 1060 | 76 | 62 | 142 |
|  | successively | 23.2 | 51.3 | 647 | MD: 1020 | 72 | 51 | 145 |
|  |  |  |  |  | TD: 880 | 94 |  |  |

Comp. Ex.: Comparative Example

When the films were biaxially stretched simultaneously, the tensile strengths were nearly the same in all directions and, hence, representative values are described. When biaxially stretched successively, the direction in which the film was first stretched was denoted as MD direction and the direction in which the film was then stretched perpendicularly thereto was denoted as TD direction. In checking the tensile strengths in all directions, it was confirmed that a maximum value was exhibited in the MD direction and a minimum value was exhibited in the TD direction. In this case, therefore, the strengths in both the MD direction and the TD direction were described.

TABLE 3-1

| Sample No. | Stretching method | Melting point of film (°C.) | Film heat-treating temperature (°C.) | | | | | | | | |
|---|---|---|---|---|---|---|---|---|---|---|---|
| | | | 150 | 155 | 160 | 165 | 170 | 175 | 180 | 185 | 190 |
| Example 1 | simultaneously | 133.4 | — | — | E | E | E | B | B | — | — |
| | successively | 133.4 | — | — | E | E | E | B | B | — | — |
| Example 2 | simultaneously | 132.0 | — | — | E | E | E | B | B | — | — |
| | successively | 132.4 | — | — | E | E | E | B | B | — | — |
| Example 3 | simultaneously | 132.9 | E | E | E | E | E | E | E | E | E |
| | successively | 133.8 | E | E | E | E | E | E | E | E | E |
| Example 4 | simultaneously | 135.6 | E | E | E | E | E | E | E | E | E |
| | successively | 136.0 | E | E | E | E | E | E | E | E | E |
| Example 5 | simultaneously | 135.6 | E | E | E | E | E | E | E | E | E |
| | successively | 135.1 | E | E | E | E | E | E | E | E | E |
| Example 6 | simultaneously | 135.6 | E | E | E | E | E | E | E | E | E |
| | successively | 136.9 | E | E | E | E | E | E | E | E | E |

B: Breakage of film was visually observed during the treatment.
NF: Sheaf-like lamella structure and pinholes were observed through an electron microscope.
F: Sheaf-like lamella structure was observed through an electron microscope.
E: Porous structure was observed through an electron microscope.
—: Not tested.

TABLE 3-2

| Sample No. | Stretching method | Melting point of film (°C.) | Film heat-treating temperature (°C.) | | | | | | | | |
|---|---|---|---|---|---|---|---|---|---|---|---|
| | | | 150 | 155 | 160 | 165 | 170 | 175 | 180 | 185 | 190 |
| Comparative Example 1 | simultaneously | 131.2 | E | E | E | B | B | — | — | — | — |
| | successively | 131.2 | E | E | E | B | B | — | — | — | — |
| Comparative Example 2 | simultaneously | 137.4 | E | E | E | E | B | — | — | — | — |
| | successively | 137.8 | E | E | E | E | B | — | — | — | — |
| Comparative Example 3 | simultaneously | 134.7 | E | E | E | E | B | — | — | — | — |
| | successively | 135.6 | E | E | E | E | B | — | — | — | — |
| Comparative Example 4 | simultaneously | 133.4 | F | F | UF | B | — | — | — | — | — |
| | successively | 133.4 | F | F | UF | B | — | — | — | — | — |
| Comparative Example 5 | simultaneously | 132.0 | F | F | B | B | — | — | — | — | — |
| | successively | 132.4 | F | F | B | B | — | — | — | — | — |
| Comparative Example 6 | simultaneously | 131.2 | F | F | B | B | — | — | — | — | — |
| | successively | 131.2 | F | F | B | B | — | — | — | — | — |
| Comparative Example 7 | simultaneously | 145.0 | F | F | B | B | — | — | — | — | — |
| | successively | 140.1 | F | F | B | B | — | — | — | — | — |

B: Breakage of film was visually observed during the treatment.
NF: Sheaf-like lamella structure and pinholes were observed through an electron microscope.
F: Sheaf-like lamella structure was observed through an electron microscope.
E: Porous structure was observed through an electron microscope.
—: Not tested.

TABLE 3-3

| Sample No. | Stretchin method | Melting point of film (°C.) | Film heat-treating temperature (°C.) | | | | | | | | |
|---|---|---|---|---|---|---|---|---|---|---|---|
| | | | 150 | 155 | 160 | 165 | 170 | 175 | 180 | 185 | 190 |
| Comparative Example 8 | simultaneously | 133.4 | F | NF | B | B | — | — | — | — | — |
| | successively | 133.4 | F | NF | B | B | — | — | — | — | — |
| Comparative Example 9 | simultaneously | 132.0 | F | F | NF | B | B | — | — | — | — |
| | successively | 132.4 | F | F | NF | B | B | — | — | — | — |

B: Breakage of film was visually observed during the treatment.
NF: Sheaf-like lamella structure and pinholes were observed through an electron microscope.
F: Sheaf-like lamella structure was observed through an electron microscope.
E: Porous structure was observed through an electron microscope.
—: Not tested.

We claim:

1. A porous biaxially oriented film, comprising an ethylene/α-olefin copolymer, wherein said copolymer:
   (a) is obtained by copolymerizing ethylene and an α-olefin having 4 to 8 carbon atoms;
   (b) contains the α-olefin in an amount of from 1.0 to 7.5 per 1000 carbon atoms of the copolymer; and
   (c) has an intrinsic viscosity ($\eta$) of from 3.5 to 10.0 dl/g;
wherein said film:

(1) has a microporous structure in which are uniformly dispersed microfibrils of the ethylene/α-olefin copolymer;

(2) loses gas permeability, but retains a structure based upon said microfibrils, when heat-treated at 160° C. in a constrained state and observed at room temperature; and (3) the temperature at which the film breaks after having lost gas permeability is not lower than 170° C.

2. The porous biaxially oriented film comprising microfibrils according to claim 1, wherein said film:

(a) has a tensile strength not smaller than 900 kg/cm$^2$ in all directions;

(b) has a gas permeability of from 50 to 1000 sec/100 cc; and (c) loses gas permeability at a temperature not higher than 150° C.

3. A porous biaxially oriented film comprising microfibrils, which is obtained by a process comprising:

(a) mixing a copolymer of ethylene and an α-olefin having 4 to 8 carbon atoms, wherein said copolymer has an intrinsic viscosity (η) of from 3.5 to 10.0 dl/g, and wherein said α-olefin is present in an amount of from 1.0 to 7.5 per 1000 carbon atoms of said copolymer, and a plasticizer compatible with said copolymer in a molten state;

(b) cooling and solidification to obtain a sheet;

(c) biaxially stretching said sheet in a state where all or part of the plasticizer is left in said sheet; and (d) removing the remaining plasticizer after the stretching;

wherein the porous biaxially oriented film comprising microfibrils breaks, after having lost gas permeability, at a temperature not lower than 170° C.

4. The porous biaxially oriented film comprising microfibrils according to claim 3, wherein said film:

(a) has a tensile strength not smaller than 900 kg/cm$^2$ in all directions;

(b) has a gas permeability of from 50 to 1000 sec/100 cc; and (c) loses gas permeability at a temperature not higher than 150° C.

5. The porous biaxially oriented film comprising microfibrils according to claim 1, wherein the number of carbon atoms of the α-olefin in the ethylene/α-olefin copolymer is from 5 to 8.

6. The biaxially oriented film according to claim 1, wherein the ethylene/α-olefin copolymer has a ratio of weight-average molecular weight/number-average molecular weight of not larger than 13.

7. A separator for batteries comprising a biaxially oriented film of claim 1.

8. The porous biaxially oriented film comprising microfibrils according to claim 2, wherein the number of carbon atoms of the α-olefin in the ethylene/α-olefin copolymer is from 5 to 8.

9. The porous biaxially oriented film comprising microfibrils according to claim 3, wherein the number of carbon atoms of the α-olefin in the ethylene/α-olefin copolymer is from 5 to 8.

10. The porous biaxially oriented film comprising microfibrils according to claim 4, wherein the number of carbon atoms of the α-olefin in the ethylene/α-olefin copolymer is from 5 to 8.

11. The biaxially oriented film according to claim 2, wherein the ethylene/α-olefin copolymer has a ratio of weight-average molecular weight/number-average molecular weight of not larger than 13.

12. The biaxially oriented film according to claim 3, wherein the ethylene/α-olefin copolymer has a ratio of weight-average molecular weight/number-average molecular weight of not larger than 13.

13. The biaxially oriented film according to claim 4, wherein the ethylene/α-olefin copolymer has a ratio of weight-average molecular weight/number-average molecular weight of not larger than 13.

14. The biaxially oriented film according to claim 5, wherein the ethylene/α-olefin copolymer has a ratio of weight-average molecular weight/number-average molecular weight of not larger than 13.

15. A separator for batteries comprising a biaxially oriented film of claim 2.

16. A separator for batteries comprising a biaxially oriented film of claim 3.

17. A separator for batteries comprising a biaxially oriented film of claim 4.

18. A separator for batteries comprising a biaxially oriented film of claim 5.

19. A separator for batteries comprising a biaxially oriented film of claim 6.

* * * * *